US006745044B1

(12) United States Patent
Holtzman et al.

(10) Patent No.: US 6,745,044 B1
(45) Date of Patent: Jun. 1, 2004

(54) METHOD AND APPARATUS FOR DETERMINING AVAILABLE TRANSMIT POWER IN A WIRELESS COMMUNICATION SYSTEM

(75) Inventors: Jack Holtzman, San Diego, CA (US); Gang Bao, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 78 days.

(21) Appl. No.: 09/675,706

(22) Filed: Sep. 29, 2000

(51) Int. Cl.[7] .................................................. H04B 1/06
(52) U.S. Cl. ........................ 455/522; 455/68; 455/69; 370/318; 370/468
(58) Field of Search ................................ 370/318, 320, 370/331, 333, 335, 342, 441, 329, 468, 395.4; 455/522, 67, 13.4, 68, 69, 403, 115, 336

(56) References Cited

U.S. PATENT DOCUMENTS

| | | | |
|---|---|---|---|
| 4,901,307 A | | 2/1990 | Gilhousen et al. |
| 5,103,459 A | | 4/1992 | Gilhousen et al. |
| 5,305,468 A | * | 4/1994 | Bruckert et al. ............... 455/69 |
| 5,845,208 A | * | 12/1998 | Hottinen et al. ............. 455/422 |
| 5,873,028 A | * | 2/1999 | Nakano et al. ............... 375/346 |
| 5,914,950 A | * | 6/1999 | Tiedemann et al. ......... 370/335 |
| 5,923,650 A | * | 7/1999 | Chen et al. .................. 370/331 |
| 6,088,324 A | * | 7/2000 | Sato ............................ 370/203 |
| 6,335,922 B1 | * | 1/2002 | Tiedemann et al. ......... 370/335 |
| 6,374,085 B1 | * | 4/2002 | Saints et al. ................. 455/522 |
| 6,381,445 B1 | * | 4/2002 | Ue et al. ....................... 455/63 |
| 6,389,296 B1 | * | 5/2002 | Shiraki et al. ............... 370/335 |
| 6,408,165 B1 | * | 6/2002 | Raissinia et al. ............ 455/522 |
| 6,418,321 B1 | * | 7/2002 | Itoh ............................ 455/504 |

FOREIGN PATENT DOCUMENTS

| | | | |
|---|---|---|---|
| DE | 10046655 A1 | * | 9/2000 |
| EP | 996240 A2 | * | 4/2000 |
| WO | 98/35514 | * | 8/1998 |

OTHER PUBLICATIONS

U.S. application No. 08/798,951, entitled "Method and Apparatus for Forward Link Rate Scheduling," filed Sep. 17, 1999, now pending. Yu–Cheun Jou, et al., QUALCOMM Inc., San Diego, CA (USA).

U.S. application No. 08/963,386, entitled "Method and Apparatus for High Rate Packet Data Transmission," filed Nov. 3, 1997, now pending. Paul E. Bender, et al., QUALCOMM Inc., San Diego, CA (USA).

U.S. application No. 09/528,235, entitled "Forward–Link Scheduling in a Wireless Communication System," filed Mar. 17, 2000, now pending. Chen Tao, et al., QUALCOMM Inc., San Diego, CA (USA).

* cited by examiner

*Primary Examiner*—Cong Van Tran
(74) *Attorney, Agent, or Firm*—Philip Wadsworth; Kent Baker; Tom Rouse (57) ABSTRACT

Techniques to (more accurately) estimate the transmit power available for data service in a future time period (e.g., the next frame). In accordance with one aspect, variation in the available transmit power over time is estimated. A first margin is then computed and used to account for the estimated variation in the available transmit power. The available transmit power at a future time instance (e.g., the beginning of the next frame) is predicted and reduced by the first margin to derive a more accurate estimate of the available transmit power for the next frame. In accordance with another aspect, variation in the required transmit power for a particular data user is estimated and used in scheduling data transmission to this data user. A second margin can be computed and used to account for the estimated variation in the required transmit power for the data user. Whereas the first margin accounts for variation in the (overall) available transmit power, the second margin is specific to the particular link conditions experienced by the data user.

41 Claims, 7 Drawing Sheets

METHOD AND APPARATUS FOR DETERMINING AVAILABLE TRANSMIT POWER IN A WIRELESS COMMUNICATION SYSTEM

BACKGROUND

I. Field

The present invention relates to data communication. More particularly, the present invention relates to novel and improved techniques for determining the available transmit power for data transmissions in a wireless communication system.

II. Background

A modern day communication system is required to support a variety of applications. One such communication system is a code division multiple access (CDMA) system that supports voice and data communication between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM." A specific CDMA system is disclosed in U.S. patent application Ser. No. 08/963,386, entitled "METHOD AND APPARATUS FOR HIGH RATE PACKET DATA TRANSMISSION," filed Nov. 3, 1997 (the HDR system), now U.S. Pat. No. 6,574,211, issued on Jun. 3, 2003 to Padovani et al. These patents and patent applications are assigned to the assignee of the present invention and incorporated herein by reference.

CDMA systems are typically designed to conform to one or more standards. Such standards include the "TIA/EIA/IS-95-B Mobile Station-Base Station Compatibility Standard for Dual-Mode Wideband Spread Spectrum Cellular System" (the IS-95 standard), the "TIA/EIA/IS-98 Recommended Minimum Standard for Dual-Mode Wideband Spread Spectrum Cellular Mobile Station" (the IS-98 standard), the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and the "TR-45.5 Physical Layer Standard for cdma2000 Spread Spectrum Systems" (the cdma2000 standard). New CDMA standards are continually proposed and adopted for use. These CDMA standards are incorporated herein by reference.

Some CDMA systems are capable of supporting different types of service (e.g., voice, data, and so on) over the forward and reverse links. Each type of service is typically characterized by a particular set of requirements.

Voice service typically requires a fixed and common grade of service (GOS) for all users as well as a (relatively) stringent and fixed delay. For example, the overall one-way delay of speech frames may be specified to be less than 100 msec. These requirements may be satisfied by providing a fixed (and guaranteed) data rate for each user (e.g., via a dedicated channel assigned to the user for the duration of a communication session) and ensuring a maximum (tolerable) error rate for speech frames independent of the link resources. To maintain the required error rate at a particular data rate, a higher allocation of resources is required for a user having a degraded link.

In contrast, data service may be able to tolerate different GOS for different users and may further be able to tolerate variable amounts of delays. The GOS of a data service is typically defined as the total delay incurred in the transfer of a data message. The transmission delay can be a parameter used to optimize the efficiency of a data communication system.

To support both types of service, a CDMA system can be designed and operated to first allocate transmit power to (voice) users requiring a particular GOS and shorter delays. Any remaining transmit power can then be allocated to (data) users that can tolerate longer delays.

Numerous challenges are encountered in implementing a CDMA system capable of supporting different types of service. First, the transmit power required by voice users can vary during their communication sessions. Consequently, the amount of transmit power available for data users can vary from one (e.g., 20 msec) transmission interval to the next, and possibly even within the transmission interval. Second, the transmit power required for a particular data user may also vary during a data transmission.

The available transmit power for data service and the required transmit power for a particular data transmission are each typically estimated or predicted at a particular moment in time (e.g., at the time data transmissions are scheduled) for a particular future moment in time (e.g., the start of the next transmission interval). However, the link conditions may change during the next transmission interval, and the estimated available and required transmit power may not be accurate over the entire transmission interval. If the estimated available transmit power is too high and/or the estimated required transmit power is too low, excessive frame errors may occur for a data transmission (thereby degrading performance). Alternatively, if the estimated available transmit power is too low and/or the estimated required transmit power is too high, valuable system resources may be under-utilized.

As can be seen, techniques that can be used to accurately estimate the transmit power available for data service and the transmit power required for a data transmission in a CDMA communication system are highly desirable.

SUMMARY

The present invention provides techniques to accurately estimate the transmit power available for data transmissions and the transmit power required for a particular data transmission for a future time period (e.g., the next frame). In accordance with one aspect of the invention, variation in the available transmit power over time is estimated. A first margin is then computed and used to account for the estimated variation in the available transmit power. The available transmit power at a future time instance (e.g., the beginning of the next frame) is predicted and reduced by the first margin to derive a more accurate estimate of the available transmit power.

In accordance with another aspect of the invention, variation in the transmit power required for a data transmission to a particular data user is estimated and used in scheduling the data transmission to this data user. A second margin can be computed and used to account for the estimated variation in the required transmit power for this data user. Whereas the first margin accounts for variation in the (overall) available transmit power, the second margin is specific to the link conditions experienced by the data user.

A specific embodiment of the invention provides a method for estimating transmit power available for data transmissions for a future time period (e.g., the next frame). In accordance with the method, a (previously) predicted available transmit power for a prior time instance and a (previously computed) average available transmit power for a prior time period are received. Variation in the available transmit power over time is estimated based on the received predicted and average available transmit power. A margin is then determined to account for the estimated variation in the available transmit power. The available transmit power at a future time instance (e.g., the beginning of the next frame) is then predicted and subtracted by the margin to derive an estimated available transmit power for the future time period.

Other embodiments include methods, schedulers, and other elements that implement various aspects and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
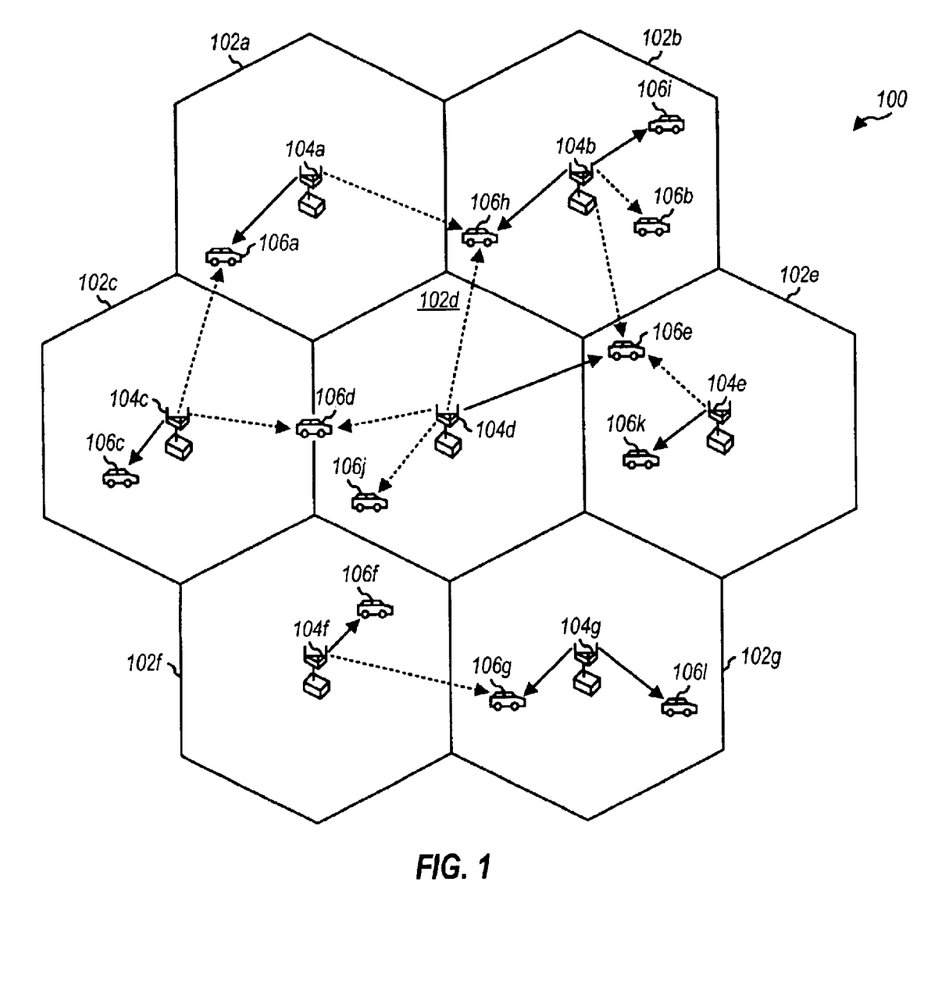
FIG. 1 is a diagram of a communication system that supports a number of users and can be used to implement various embodiments of the invention.

FIG. 1 is a diagram of a communication system 100 that supports a number of users and can be used to implement various aspects of the invention. System 100 may be designed to conform to one or more CDMA standards such as the IS-95, W-CDMA, cdma2000, or some other standards, one or more CDMA designs such as the HDR design, or a combination thereof. System 100 provides communication for a number of cells 102a through 102g, with each cell 102 being serviced by a corresponding base station 104. Various remote terminals 106 are dispersed throughout the system.

Each remote terminal 106 may communicate with one or more base stations 104 on the downlink and uplink at any given moment (e.g., depending on the particular CDMA system design and whether the remote terminal is in soft handoff). The forward link (downlink) refers to transmission from the base station to the remote terminal, and the reverse link (uplink) refers to transmission from the remote terminal to the base station. In FIG. 1, a broken line with an arrow indicates transmission of one type of service (e.g., voice) from the base station to the remote terminal, and a solid line with an arrow indicates transmission of another type of service (e.g., data). Although not explicitly shown in FIG. 1, a remote terminal may also receive both voice and data transmissions from one base station. The uplink communication is not shown in FIG. 1 for simplicity.

As shown in FIG. 1, base station 104a transmits to remote terminals 106a and 106h on the downlink; base station 104b transmits to remote terminals 106b, 106e, 106h, and 106i; base station 104c transmits to remote terminals 106a, 106c, and 106d, and so on. In the example shown in FIG. 1, remote terminal 106h receives voice transmissions from base stations 140a and 104d (e.g., for soft handoff) and a data transmission from base station 104b.

In some CDMA systems, a power control mechanism is maintained to adjust the forward link transmit power to each remote terminal such that a desired level of performance (e.g., one percent frame error rate (FER)) is achieved. The forward link power control mechanism can measure the quality (e.g., the signal-to-total-noise ratio) of the signal received from a remote terminal, estimate the forward link condition based on the received signal quality, and adjust the forward link transmit power accordingly. If the received signal quality is poor, indicating that the reverse link is degraded, the forward link can be estimated to be degraded by a corresponding amount, and the forward link transmit power can be increased accordingly.

Figure 2:
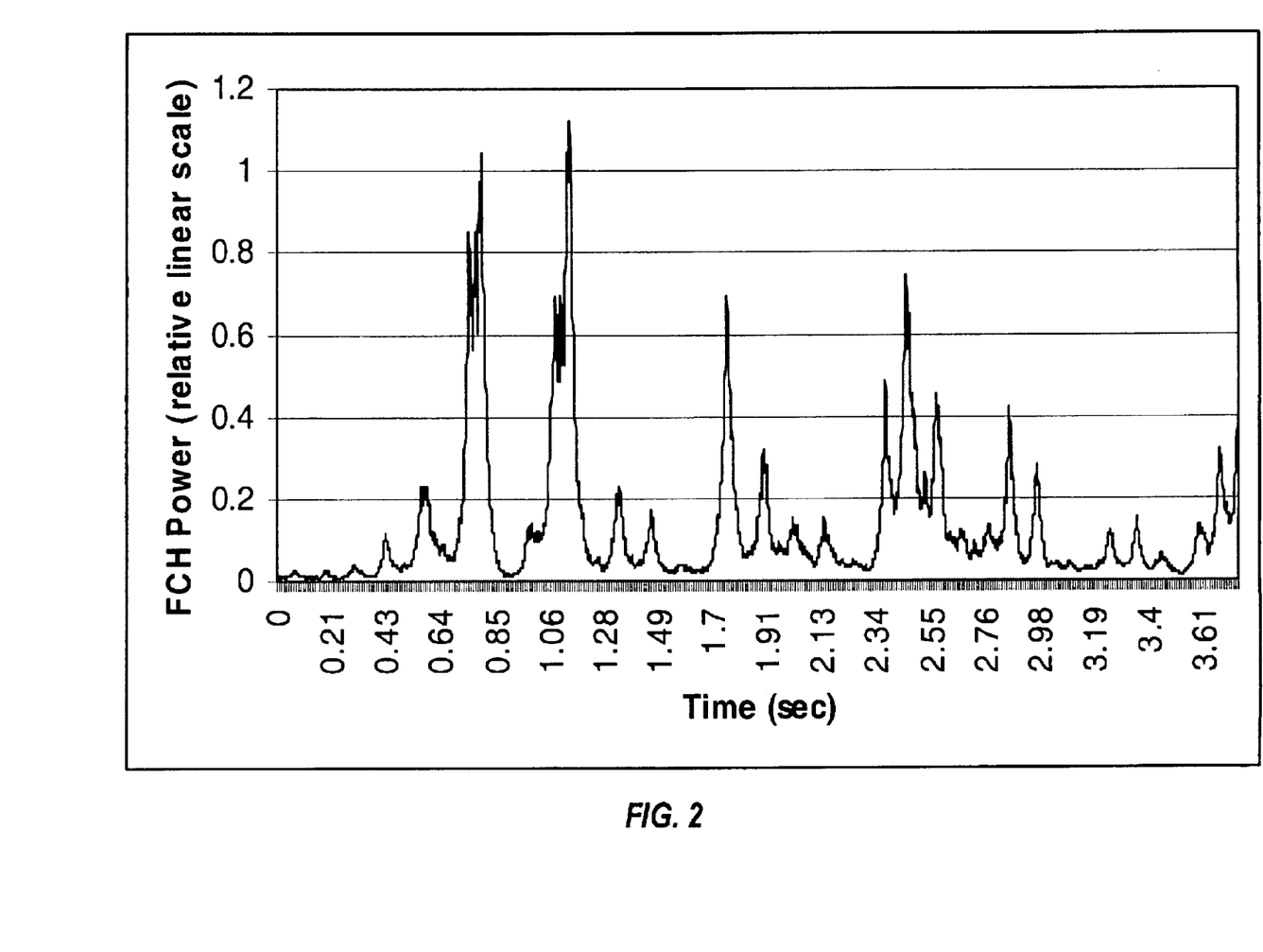
FIG. 2 is a plot of the forward link transmit power for a particular voice transmission to a remote terminal.

FIG. 2 is a plot of the forward link transmit power for a particular voice transmission to a remote terminal. The horizontal axis denotes time, which is provided in unit of seconds. The vertical axis denotes the transmit power for the transmission to the remote terminal and is provided in relative linear scale. In this plot, the transmit power to the remote terminal is adjusted to maintain the desired level of performance (e.g., 1% FER). It can be noted that the transmit power for a voice transmission can vary widely over time, depending on the amount of degradation in the transmission link due to, for example, fading and multipath.

CDMA systems can be designed and operated to support different types of service. One type of service can include transmissions that are typically not scheduled because of intolerance to additional processing delays (e.g., voice, certain types of data such as acknowledgment messages for higher layers, and so on). Another type of service can include transmissions that can tolerate additional processing and queuing delays, and can thus be scheduled. This type includes most data communication between the base stations and remote terminals.

For CDMA systems that support voice and data services, preference is typically given to voice service because of the shorter delays and the fixed QOS requirements. At each scheduling time interval, a determination can be made of the amount of transmit power needed for voice service and other transmissions (e.g., overhead). A determination can then be made of the remaining available transmit power that can be used for data service.

For many CDMA systems, data is transmitted in "frames" that cover a particular time interval. For example, for the cdma2000 system, data can be transmitted in frame sizes ranging from 5 msec to 20 msec on each of the fundamental and supplemental channels. Typically, the scheduling of data transmissions for each base station is performed once for each scheduling interval (e.g., every 20 msec frame) at a particular scheduling time instance $t_{sch}$. Prior to the scheduling time instance, the parameters needed for scheduling data transmissions in the next frame are collected. These parameters may include, for example, the transmit power available for data service, the data requests, and so on. Based on the collected parameter values, data transmissions are scheduled for the next interval.

In the cdma2000 system, a voice transmission is typically sent over a fundamental channel (FCH) and a data transmission is typically sent over a supplemental channel (SCH). To receive a data transmission on the supplemental channel, a remote terminal is also typically assigned a fundamental channel. The transmit power for the fundamental channel is adjusted by a power control mechanism to maintain the desired level of performance. In the cdma2000 system, the remote terminal may communicate with one or more base stations for voice transmission and typically (but not necessarily) communicate with only one base station for data transmission. These base stations are placed in the corresponding voice and data active sets of the remote terminal.

At any particular instance in time t, the transmit power available for data transmissions (e.g., on the supplemental channels) can be computed as:

$$P_{avail}(t) = P_{total}(t) - \sum_{i=1}^{N} P_i^F(t) - \sum P_{voice}(t) - \sum P_{other}(t), \quad \text{Eq (1)}$$

where $P_{total}(t)$ is the total transmit power at time t for a sector (or base station);

$P_i^F(t)$ is the transmit power at time t for the fundamental channel that is also associated with a supplemental channel (e.g., the voice component of a voice+data user);

$P_{voice}(t)$ is the transmit power at time t for a voice-only user; and $P_{other}(t)$ is the transmit power at time t for other channels (e.g., pilot, paging, control, or some other overhead channel).

Equation (1) can be computed in a straightforward manner if all transmit power terms are well defined (i.e., the transmit power is known and constant across each frame). However, due to changes in the link conditions, the transmit power for the fundamental channel may be adjusted during the frame interval to maintain the desired frame error rate. For example, for the cdma2000 system, the actual transmit power for each fundamental channel may be adjusted up or down (by defined increments) at a rate of up to 800 times per second (i.e., every 1.25 msec). Thus, the actual transmit power for the fundamental channels can vary across the frame interval, and can be higher than the transmit power at the beginning of the frame.

Figure 3:
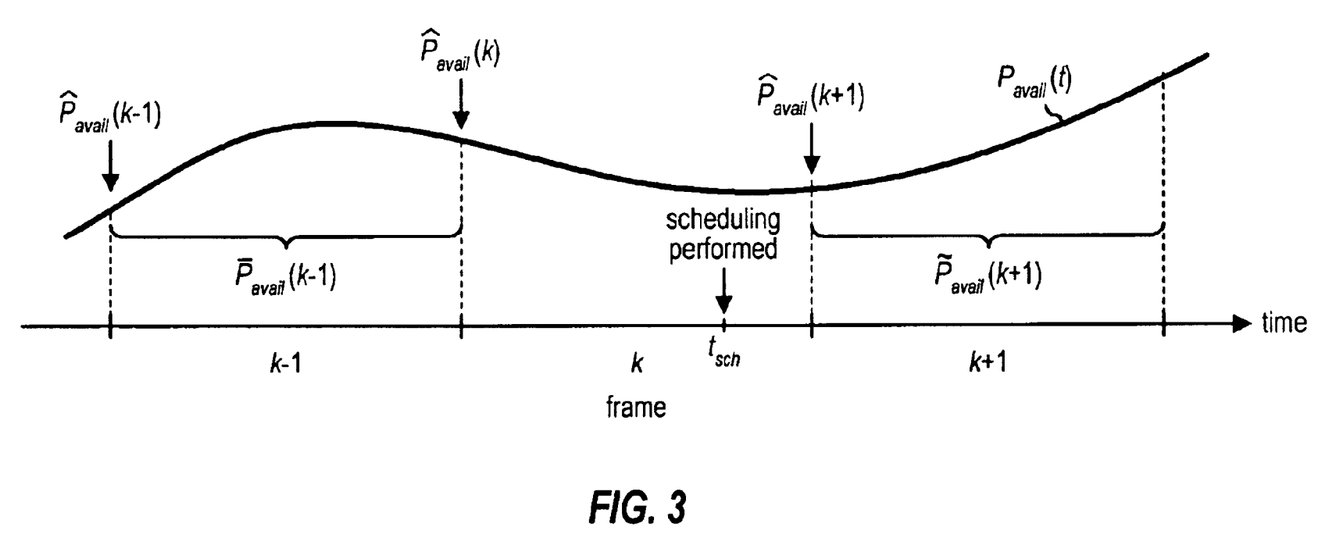
FIG. 3 is a diagram that illustrates the available transmit power for data service over a number of frames.

FIG. 3 is a diagram that illustrates the available transmit power $P_{avail}(t)$ for data service over a number of frames. At a particular scheduling time instance $t_{sch}$ during the current frame k, scheduling is performed for data transmissions in the next frame k+1. The available transmit power $\hat{P}_{avail}(k+1)$ at the beginning of the next frame k+1 can be predicted with a (relatively) high degree of confidence (based on the forward link transmit power history) because of its close temporal proximity to the current scheduling time instance in frame k. However, because of changes in the link conditions, the available transmit power will likely vary across frame k+1.

In accordance with an aspect of the invention, the variation in the available transmit power over time (e.g., due to variation in the required transmit power for other types of service and transmissions) is estimated and used to provide a better estimate of the available transmit power for the next frame k+1. Specifically, a margin is computed to account for the estimated amount of variation in the available transmit power (i.e., for the variation estimated to occur in the next frame). The available transmit power $\hat{P}_{avail}(k+1)$ at some future time instance (e.g., the beginning of the next frame) can be predicted and then reduced by the computed margin $P_{mar1}(k+1)$ to derive a (typically more accurate) estimate of the available transmit power $\tilde{P}_{avail}(k+1)$ for data service for the next frame.

The accuracy of the estimated amount of variation in the available transmit power can have a high degree of impact on the performance of the system. If the estimated amount of variation is (much) less than the actual amount (e.g., the transmit power for other types of service and transmissions increases more during the frame than estimated), the power available for data transmissions is reduced correspondingly. When this occurs, the signal quality of the data transmissions can be degraded, which may result in a higher frame error rate. Alternatively, if the estimated amount of variation is (much) more than the actual amount, too much margin is provided and the available transmit power is not fully utilized.

In an embodiment, the margin $P_{mar1}(k+1)$ to be used for the next frame is computed based on the estimated amount of variation in the available transmit power during current and past frames (i.e., prior to the current scheduling time instance). In one implementation, the margin is computed based on a difference between a (previously) predicted available transmit power for a prior time instance and a (previously computed) average available transmit power for a previous frame. Both of these quantities are available at the current scheduling time instance.

As shown in FIG. 3, the average available transmit power $\overline{P}_{avail}(k-1)$ for the previous frame k−1 and the predicted available transmit power $\hat{P}_{avail}(k-1)$ for the beginning of the previous frame k−1 are both available at the scheduling time instance $t_{sch}$ in the current frame k. The available transmit power can be averaged over a particular time period (e.g., one frame) to obtain an average available transmit power. For example, the available transmit power can be averaged over the preceding frame k−1, as shown in FIG. 3. Alternatively, the available transmit power can be average over a non-aligned frame period (i.e., across the frame boundary) that can end at any time prior to the current scheduling time instance $t_{sch}$. The averaging can be achieved based on a linear weighting that equally weighs all measurements received over the frame, an exponential weighting that gives higher weights to more recent measurements, or some other weighting scheme.

The difference $d_1(k-1)$ between the predicted available transmit power $\hat{P}_{avail}(k-1)$ at the beginning of frame k−1 and the average available transmit power $\overline{P}_{avail}(k-1)$ for frame k−1 can be computed as:

$$d_1(k-1) = \overline{P}_{avail}(k-1) - \hat{P}_{avail}(k-1). \quad \text{Eq (1)}$$

Alternatively, the difference between the predicted available transmit power $\hat{P}_{avail}(k)$ at the beginning of frame k and the average available transmit power $\overline{P}_{avail}(k-1)$ for frame k−1 can be computed. The difference $d_1(k-1)$ can then be averaged using, for example, an exponential weighting function. The exponentially averaged difference $e_1(k)$ can be computed as:

$$e_1(k) = w_1 \cdot e_1(k-1) + (1 - w_1)[\overline{P}_{avail}(k-1) - \hat{P}_{avail}(k-1)], \quad \text{Eq (3)}$$

where $w_1$ is a weighting coefficient ($w_1 \leq 1.0$) that determines the time constant for the exponential averaging. A smaller coefficient $w_1$ weighs the current difference $d_1(k-1)$ more and corresponds to a smaller time constant ($w_1=0$ results in no averaging being performed). Alternatively, a larger coefficient $w_1$ weighs the current difference $d_1(k-1)$ less and corresponds to a larger time constant. Other weighting schemes can also be used to average the difference $d_1(k-1)$ and are within the scope of the invention.

The mean square difference $m_1^2(k)$ can also be computed as:

$$m_1^2(k) = w_1 \cdot m_1^2(k-1) + (1-w_1)\left[\overline{P}_{avail}(k-1) - \hat{P}_{avail}(k-1)\right]^2. \quad \text{Eq (4)}$$

Equation (4) shows an exponential averaging of the squared difference using the same weighting coefficient $w_1$. However, other averaging schemes and/or weighting coefficients can also be used.

The standard deviation of the variation in the available transmit power can be estimated in various manners. In one embodiment, the standard deviation $\sigma_1^2(k)$ of the difference is estimated as:

$$\sigma_1^2(k) = m_1^2(k) - e_1^2(k). \quad \text{Eq (5)}$$

In another embodiment, the standard deviation $\sigma_1^2(k)$ of the difference is estimated as:

$$\sigma_1^2(k) = w_1[d_1^2(k) - e_1^2(k)] + (1-w_1) \cdot \sigma_1^2(k-1). \quad \text{Eq (6)}$$

Other techniques to estimate or otherwise compute the standard deviation of the variation in the available transmit power can also be used and are within the scope of the invention.

In an embodiment, the margin $P_{mar1}(k+1)$ for the next frame $k+1$ can be determined based on (1) the average difference $e_1(k)$ and (2) the standard deviation $\sigma_1(k)$ estimated for the difference between the average and predicted available transmit power. In an embodiment, the margin $P_{mar1}(k+1)$ is computed as:

$$P_{mar1}(k+1) = e_1(k) + \eta_1(k) \cdot \sigma_1(k), \quad \text{Eq (7)}$$

where $\eta_1(k)$ is a weighting coefficient (e.g., $\eta_1(k) \sim 2.0$) that may be time varying.

The available transmit power $\tilde{P}_{avail}(k+1)$ for data service for the next frame $k+1$ can be estimated based on the predicted available transmit power $\hat{P}_{avail}(k+1)$ at a future time instance (e.g., the beginning of the next frame $k+1$) and the above-computed margin $P_{mar1}(k+1)$, as follows:

$$\tilde{P}_{avail}(k+1) = \hat{P}_{avail}(k+1) - P_{mar1}(k+1) \quad \text{Eq (8)}$$

$$= \hat{P}_{avail}(k+1) - e_1(k) - \eta_1(k) \cdot \sigma_1(k).$$

In equation (8), the predicted available transmit power $\hat{P}_{avail}(k+1)$ at the beginning of the next frame $k+1$ can be obtained based on a number of prediction schemes known in the art. In one simple prediction scheme, the predicted available transmit power $\hat{P}_{avail}(k+1)$ at the beginning of the next frame $k+1$ is equal to the available transmit power $P_{avail}(t_{sch})$ at the scheduling time instance $t_{sch}$ in the current frame $k$. However, other prediction schemes can also be used (e.g., $\hat{P}_{avail}(k+1)$ is a particular function of $P_{avail}(t_{sch})$ and previous values). The estimated available transmit power $\tilde{P}_{avail}(k+1)$ for frame $k+1$ can be used for data service and can be allocated to one or more data users based on various scheduling schemes.

In accordance with another aspect of the invention, the variation in the required transmit power for a particular data user is also estimated and used in the scheduling of data transmission to this data user. A second margin can be computed and used to account for the estimated variation in the required transmit power for this data user. Whereas the first margin accounts for variation in the (overall) available transmit power, the second margin is specific to the particular link conditions experienced by the data user.

In an embodiment, the second margin $p_{mar2,i}(k+1)$ for a particular data user $i$ for the next frame $k+1$ is computed based on the estimated amount of variation in the transmit power to the data user. In the cdma2000 system, each data transmission on a supplemental channel to a particular data user may be associated with a fundamental channel. The transmit power on the fundamental channel is controlled by a forward link power control loop in the manner described above. The transmit power on the supplemental channel may or may not be power controlled along with the fundamental channel. The amount of variation in the transmit power on the fundamental channel for the data user can be estimated (e.g., in a manner similar to that described above for the available transmit power).

At the scheduling time instance $t_{sch}$ in the current frame $k$, the transmit power $\hat{P}_i(k-1)$ previously predicted (e.g., during frame $k-2$) to be required for this data user during frame $k-1$ and the average transmit power $\overline{P}_i(k-1)$ required for the data user during frame $k-1$ are both available. These quantities can be computed in a manner similar to that described above for $\hat{P}_{avail}(k-1)$ and $\overline{P}_{avail}(k-1)$. Absolute or relative difference can be used to estimate the amount of variations in the transmit power to the data user. For example, the relative difference $d_{2,i}(k-1)$ between the predicted required transmit power $\hat{P}_i(k-1)$ and the average required transmit power $\overline{P}_i(k-1)$ can be computed for the data user as:

$$d_{2,i}(k-1) = \frac{\overline{P}_i(k-1) - \hat{P}_i(k-1)}{\hat{P}_i(k-1)}. \quad \text{Eq (9)}$$

Alternatively, the predicted required transmit power $\hat{P}_i(k)$ can be used in equation (9) instead of $\hat{P}_i(k-1)$. The relative difference $d_{2,i}(k-1)$ can then be averaged using, for example, an exponential weighting function. The exponentially averaged relative difference $e_{2,i}(k)$ can be computed as:

$$e_{2,i}(k) = w_2 \cdot e_{2,i}(k-1) + (1-w_2)\left[\frac{\overline{P}_i(k-1) - \hat{P}_i(k-1)}{\hat{P}_i(k-1)}\right], \quad \text{Eq (10)}$$

where $w_2$ is a weighting coefficient ($w_2 \leq 1.0$) that determines the time constant for the exponential averaging. Other weighting schemes can also be used to average the relative difference $d_{2,i}(k-1)$ and are within the scope of the invention.

The mean square relative difference $m_{2,i}^2(k)$ can also be computed for the data user as:

$$m_{2,i}^2(k) = w_2 \cdot m_{2,i}^2(k-1) + (1-w_2)\left[\frac{\overline{P}_i(k-1) - \hat{P}_i(k-1)}{\hat{P}_i(k-1)}\right]^2. \quad \text{Eq (11)}$$

Equation (11) shows an exponential averaging of the square relative difference using the same weighting coefficient $w_2$ as for equation (10). However, other weighting schemes and/or weighting coefficients can also be used.

In one embodiment, the standard deviation $\sigma_{2,i}^2(k)$ of the relative difference can be estimated for the data user as:

$$\sigma_{2,i}^2(k)=m_{2,i}^2(k)-e_{2,i}^2(k), \quad \text{Eq (12)}$$

where the mean square relative difference $m_{2,i}^2(k)$ and the average relative difference $e_{2,i}(k)$ are computed as shown in equations (11) and (10), respectively. In another embodiment, the standard deviation $\sigma_{2,i}^2(k)$ of the relative difference can be computed as:

$$\sigma_{2,i}^2(k)=w_2[d_{2,i}^2(k-1)-e_{2,i}^2(k)]+(1-w_2)\cdot\sigma_{2,i}^2(k-1). \quad \text{Eq (13)}$$

where the relative difference $d_{2,i}(k-1)$ and the average relative difference $e_{2,i}(k)$ are computed as shown in equations (9) and (10), respectively.

In an embodiment, the margin $p_{mar2,i}(k+1)$ for the data user for the next frame k+1 can be determined based on the average relative difference $e_{2,i}(k)$ and the estimated standard deviation $\sigma_{2,i}(k)$ of the relative difference. The margin $p_{mar2,i}(k+1)$ for the data user can be computed as:

$$p_{mar2,i}(k+1)=e_{2,i}(k)+\eta_{2,i}(k)\cdot\sigma_{2,i}(k), \quad \text{Eq (14)}$$

where $\eta_{2,i}(k)$ is a weighting coefficient (e.g., $\eta_{2,i}(k)\sim 2.0$) that may be time varying.

The margin calculation described above may be based on transmit power values obtained from non-continuous frames. For example, the margin may be based on power values on frames selected for sending data.

The estimated available transmit power $\tilde{P}_{avail}(k+1)$ for data service for the next frame k+1 computed in equation (8) can be allocated to a particular data user i. In this case, the estimated available transmit power $\tilde{P}_{avail}(k+1)$ can be reduced by the above-computed margin $p_{mar2,i}(k+1)$ for the data user to derive the estimated available transmit power $\tilde{P}_{data,i}(k+1)$ for the data user, as follows:

$$\tilde{P}_{data,i}(k+1) = \frac{\hat{P}_{avail}(k+1) - P_{mar1}(k+1)}{[1+p_{mar2,i}(k+1)]} \quad \text{Eq (15)}$$

$$= \frac{\hat{P}_{avail}(k+1) - e_1(k) - \eta_1(k)\cdot\sigma_1(k)}{1+e_{2,i}(k)+\eta_{2,i}(k)\cdot\sigma_{2,i}(k)},$$

In equation (15), the first margin $P_{mar1}(k+1)$ has a unit of power (see equation (2)) and is subtracted from the estimated available transmit power $\tilde{P}_{avail}(k+1)$. The second margin $p_{mar2,i}(k+1)$ is unit-less (see equation (9)) and is used to scale the estimated available transmit power $\tilde{P}_{avail}(k+1)$.

The date rate $R_i(k+1)$ for the data user for frame k+1 can be computed based on the estimated available transmit power $\tilde{P}_{avail}(k+1)$ and other parameters, as follows;

$$R_i(k+1) = \frac{R_i^F(k)\cdot\tilde{P}_{avail}(k+1)}{\tilde{P}_i^F(k+1)\cdot\alpha_{asm}} \cdot \frac{P_{CC}}{P_{TC}}, \quad \text{Eq (16)}$$

where $\tilde{P}_i^F(k+1)$ is the estimated required transmit power for the fundamental channel for the data user for the next frame k+1 at the data rate $R_i^F(k)$;

$R_i^F(k)$ is the data rate on the fundamental channel for the data user in the current frame k;

$P_{CC}$ is the power required to transmit data at the rate $R_i^F(k)$ using a particular convolutional code;

$P_{TC}$ is the power required to transmit data at the rate $R_i^F(k)$ using a particular turbo code; and $\alpha_{asm}$ is the active set margin.

As shown in equation (16), the parameters for another transmission (e.g., on the fundamental channel) are used to derive the data rate $R_i(k+1)$ for the data transmission (e.g., on the supplemental channel). The estimated transmit power $\tilde{P}_i^F(k+1)$ and data rate $R_i^F(k)$ are used to compute the required transmit power-per-bit for the data user. For the cdma2000 system, data on the supplemental channel is encoded using a Turbo code and data on the fundamental channel is encoded using a convolutional code. The ratio $P_{CC}/P_{TC}$ thus effectively scales the transmit power-per-bit required on the fundamental channel for the supplemental channel. And the active set margin $\alpha_{asm}$ accounts for the difference, if any, between the active sets for the fundamental and supplemental channels. If the fundamental channel active set is greater than one (transmission on the fundamental channel is being received from more than one base station, e.g., during soft handoff) and the supplemental channel active set is equal to one, then $\alpha_{asm}$ is greater than one. A larger than unity $\alpha_{asm}$ results in a reduced data rate on the supplemental channel, which accounts for the reduced reliability on the supplemental channel since it is transmitted from only one base station while the fundamental channel is transmitted from multiple base stations.

In equation (16), the estimated required transmit power $\tilde{P}_i^F(k+1)$ for the fundamental channel for the data user for the next frame k+1 can be determined based on various schemes, one of which is described below. Other schemes to estimate the required transmit power can also be used and are within the scope of the invention.

In accordance with an aspect of the invention, the estimated required transmit power $\tilde{P}_i^F(k+1)$ is determined based in part on the estimated fading in the channel. The scheduling of data transmission can take advantage of channel changes for slow fading, and the estimated required transmit power $\tilde{P}_i^F(k+1)$ can be based on the predicted required transmit power $\hat{P}_i^F(k+1)$. For faster fading, the predicted required transmit power may not be as correlated with the actual required transmit power in the next frame, and the estimated required transmit power $\tilde{P}_i^F(k+1)$ can be based on an average required transmit power $\overline{P}_i^F(k)$.

In this embodiment, the required transmit power $\tilde{P}_i^F(k+1)$ used to schedule data transmission for the data user can be estimated as:

$$\tilde{P}_i^F(k+1) = \hat{P}_i^F(k+1)\cdot[1+p_{mar2,i}(k+1)] \quad \text{fading} \leq \text{threshold}, \quad \text{Eq (17)}$$

$$= \overline{P}_i^F(k) \quad \text{fading} > \text{threshold}$$

where "threshold" corresponds to a particular fading threshold (or a threshold velocity of the remote terminal). For example, the threshold can be selected as 30 km/hr. As shown in equation (17), if the estimated velocity of the remote terminal is less than or equal to the threshold velocity, then the predicted required transmit power $\hat{P}_i^F(k+1)$ is used for the estimated required transmit power $\tilde{P}_i^F(k+1)$. Otherwise, if the estimated velocity is greater than the threshold velocity, the average required transmit power $\overline{P}_i^F(k)$ is used for the estimated required transmit power $\tilde{P}_i^F(k+1)$. The predicted required transmit power $\hat{P}_i^F(k+1)$ can be based on various prediction schemes known in the art. In an embodiment, the average required transmit power $\overline{P}_i^F(k)$ can be computed based on an exponential averaging as follows:

$$\overline{P}_i^F(k) = w_i \cdot \overline{P}_i^F(k-1) + (1-w_i) \cdot P_i^F(k). \qquad \text{Eq (18)}$$

The fading on the channel is related to the velocity of the remote terminal. The velocity can be estimated based on a maximum Doppler frequency, which can in turn be estimated using a "covariance method" as follows. Initially, the inphase (I) and quadrature (Q) pilot are each coherently combined over a number of chips (e.g., M chips) to obtain the $PI_i$ and $PQ_i$ pilot samples. The square of the pilot samples is then computed as:

$$SQ_i = PI_i^2 + PQ_i^2. \qquad \text{Eq (19)}$$

The mean square difference V can next be computed as:

$$V = \frac{1}{N-1} \sum_{i=1}^{N-1} (SQ_{i+1} - SQ_i)^2. \qquad \text{Eq (20)}$$

The variance Var of the squares can then be computed in a manner known in the art. The maximum Doppler frequency $\tilde{f}_d$ can be estimated as:

$$\tilde{f}_d = \frac{1}{2\pi\tau} \cdot \sqrt{\frac{V}{Var}}, \qquad \text{Eq (21)}$$

where $\tau$ is the separation and is defined as $\tau = M/\text{chiprate}$. The covariance method for estimating the maximum Doppler frequency is described in further detail in a paper by J. M. Holtzman and A. Sampath, entitled "Adaptive Average Methodology for Handoffs in Cellular Systems," IEEE Transactions on Veh. Tech., February 1995, pages 59–66, which is incorporated herein by reference.

It can be shown that the maximum Doppler frequency is proportional to velocity. Thus, a mapping can be generated (e.g., using a lookup table) between the maximum Doppler frequency estimated from equation (21) and the estimated velocity. The estimated required transmit power $\hat{P}_i^F(k+1)$ can then be determined based in part on the estimated velocity, as shown in equation (17). Alternatively, a Doppler threshold (corresponding to the threshold velocity) can be used in equation (17). In this case, the estimated maximum Doppler frequency can be computed based on equation (21) can compared against the Doppler threshold. The estimated required transmit power $\hat{P}_i^F(k+1)$ can then be determined based in part on the estimated velocity.

In the above embodiments, the first and second margins are each computed based on the difference between the predicted and average transmit power. Each margin attempts to account for variation in the respective transmit power during the transmission interval. This variation can be estimated based on the difference and standard deviation, as described above. This variation can also be estimated based on other statistical measurements and computations, and this is within the scope of the invention.

Figure 4:
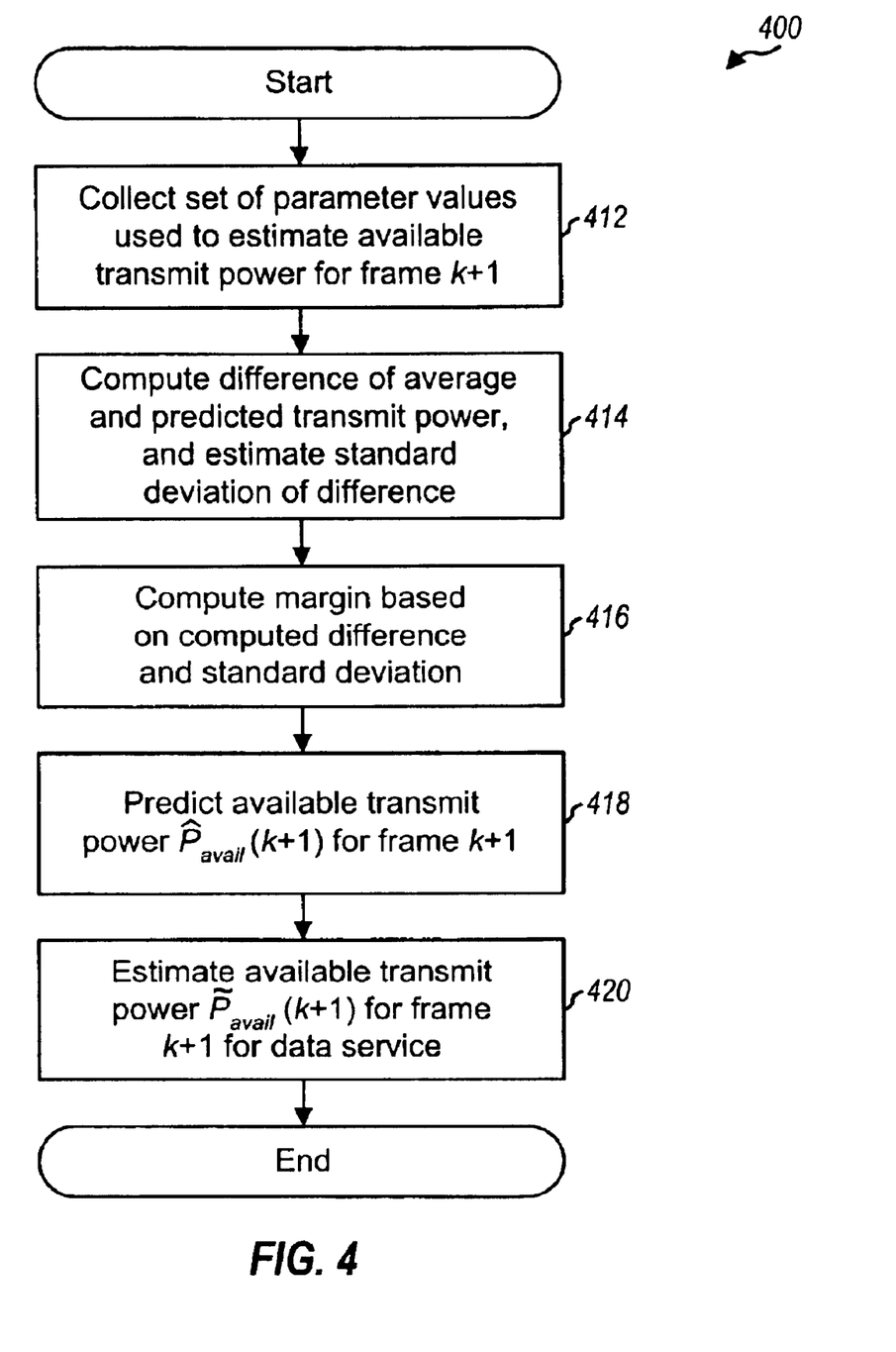
FIG. 4 is a flow diagram of a process to estimate the available transmit power for data service in accordance with an embodiment of the invention.

FIG. 4 is a flow diagram of a process 400 to estimate the available transmit power for data service in accordance with an embodiment of the invention. These types of service may include voice, data, and other services. For this system, other types of service are given higher priority than data service, and the transmit power is allocated to these other services first. Any remaining available transmit power is then used for transmissions to data users.

Initially, at each scheduling time instance, the values for a set of parameters used to estimate the available transmit power for the next frame k+1 are collected, at step 412. As described above, these parameters may include the average available transmit power $\overline{P}_{avail}(k-1)$ for frame k-1 and the predicted available transmit power $\hat{P}_{avail}(k-1)$ for the beginning of frame k-1. Once the required parameter values have been collected, the difference between the average and predicted available transmit power is computed and the standard deviation of the difference is estimated, at step 414. The difference and standard deviation can be computed or estimated in the manner described above.

A margin $P_{mar1}(k+1)$ is then computed for the next frame k+1 based on the computed difference and standard deviation, at step 416. The available transmit power $\hat{P}_{avail}(k+1)$ at the beginning of the next frame is then predicted, at step 418. This can be achieved by predicting the variable and fixed transmit power required for other types of service and transmissions (e.g., voice, overhead, and so on) and subtracting the required transmit power from the total transmit power from the cell, as shown in equation (1). The estimated available transmit power $\tilde{P}_{avail}(k+1)$ for data service for the next frame k+1 can then be computed based on the predicted available transmit power $\hat{P}_{avail}(k+1)$ and the computed margin $P_{mar1}(k+1)$ as shown in equation (8), at step 420. Thereafter, transmissions for data users can be scheduled based on the estimated available transmit power $\tilde{P}_{avail}(k+1)$ and other factors, as described below.

Figure 5:
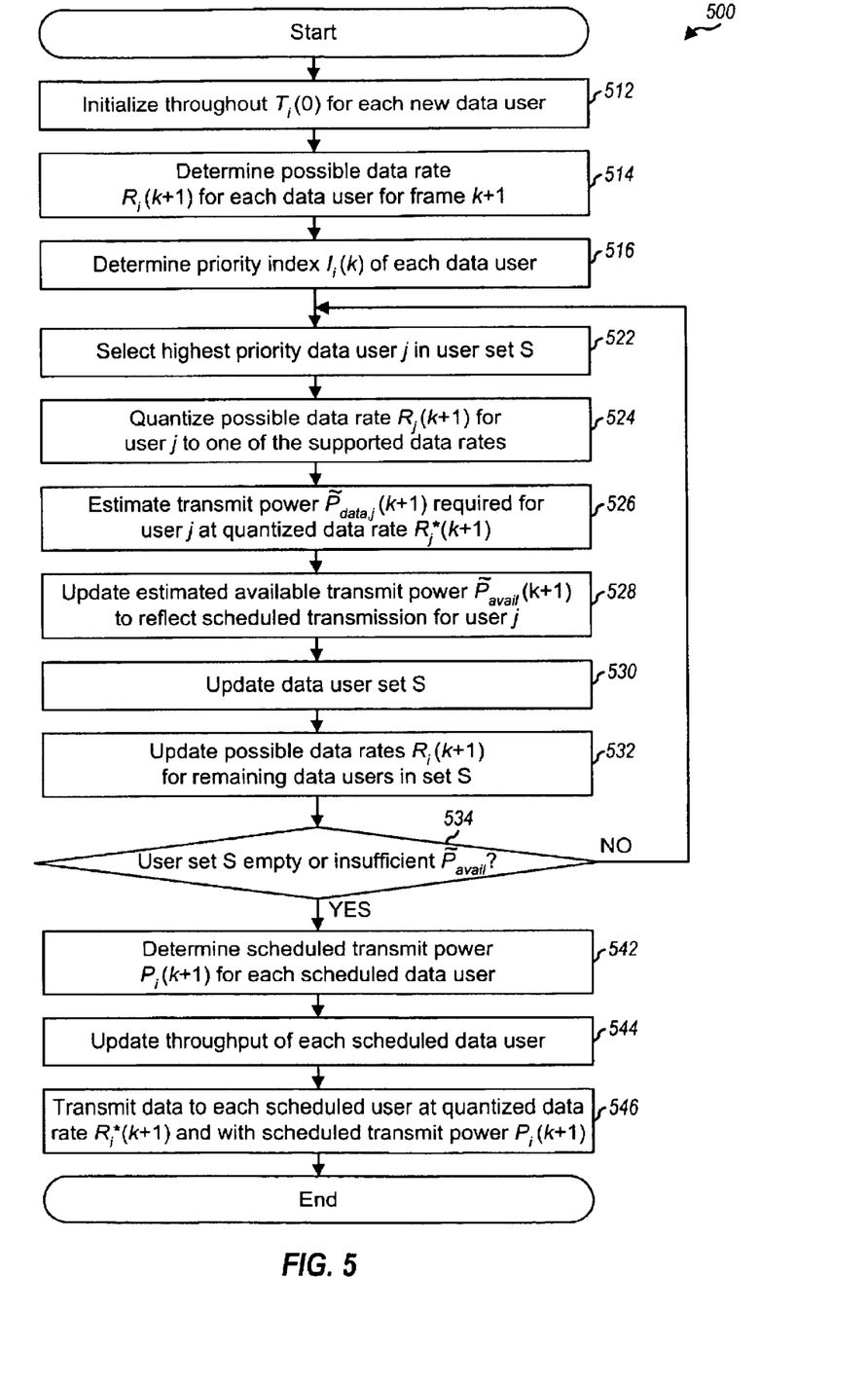
FIG. 5 is a flow diagram of a process to schedule and transmit data to data users in accordance with an embodiment of the invention.

FIG. 5 is a flow diagram of a process 500 to schedule and transmit data to data users in accordance with an embodiment of the invention. Process 500 can be executed for each transmission interval (e.g., each 20 msec frame).

Prior to scheduling transmission to a new data user, the throughput $T_i(0)$ of the data user is initialized to a particular data rate (e.g., $T_i(0)=9.6$ Kbps), at step 512. For each data user desiring data transmission and placed in a data user set S, a possible data rate $R_i(k+1)$ for the data user for the next frame k+1 is computed, at step 514. The possible data rate $R_i(k+1)$ for each data user can be computed based on equations (15), (16), and (17) and is dependent on, among other factors, the estimated available transmit power $\tilde{P}_{avail}(k+1)$, the first margin $P_{mar1}(k+1)$ for the available transmit power, and the second margin $p_{mar2,i}(k+1)$ for the data user.

In the embodiment shown in FIG. 5, transmissions to data users are scheduled based on (1) the estimated available transmit power $\tilde{P}_{avail}(k+1)$ for frame k+1 and (2) a priority index $I_i(k)$ computed for each data user. In an embodiment, the priority index $I_i(k)$ of each data user is determined based on its possible data rate $R_i(k+1)$ and its current throughput $T_i(k)$. In an embodiment, the priority index $I_i(k)$ can be computed for each data user as:

$$I_i(k) = \frac{R_i(k+1)}{T_i(k)}. \qquad \text{Eq (22)}$$

The use of the throughput $T_i(k)$ in determining the priority index $I_i(k)$ ensures a level of fairness such that a data user associated with a degraded link does not wait indefinitely for a data transmission. Other priority indices can also be used and are within the scope of the invention.

Once the possible data rate $R_i(k+1)$ and priority index $I_i(k)$ have been computed for all data users in the user set S, data transmissions can be scheduled for the data users. At step 522, the data user j having the highest priority index in the user set S is selected for scheduling. The selection can be achieved based on the following:

$$I_j(k) = \max_{i \in S}\{I_i(k)\}. \qquad \text{Eq (23)}$$

The previously determined possible data rate $R_j(k+1)$ for the selected data user is then quantized to one of the supported data rates $\{0, R_{min}, \ldots R_i, R_{i+1}, \ldots R_{max}\}$, at step 524. The quantized rate $R_j^*(k+1)$ for the selected data user can be determined as:

$$R_j^*(k+1) = \begin{cases} 0 & R_j(k+1) < R_{min} \\ R_{max} & R_j(k+1) \geq R_{min} \\ R_l & R_l \leq R_j(k+1) < R_{l+1} \end{cases} \qquad \text{Eq (24)}$$

In equation (24), the data rate for the selected data user is set (1) to zero if the possible data rate $R_j(k+1)$ is less than the lowest supported date rate $R_{min}$, (2) to $R_{max}$ if the possible data rate $R_j(k+1)$ is greater than or equal to the highest supported date rate $R_{max}$, or (3) to the next lower quantized data rate $R_i$ otherwise, where $R_i \leq R_j(k+1) < R_{i+1}$.

The transmit power $P_j^*(k+1)$ needed to support the selected data user at the quantized data rate $R_j^*(k+1)$ in the next frame can be computed, at step 526, as:

$$P_j^*(k+1) = \frac{R_j^*(k+1) \cdot \tilde{P}_j^F(k+1) \cdot \alpha_{asm}}{R_j^F(k)} \cdot \frac{P_{TC}}{P_{CC}}. \qquad \text{Eq (25)}$$

The estimated available transmit power $\tilde{P}_{avail}(k+1)$ is then updated to reflect the scheduled data transmission for user j at the quantized data rate $R_j^*(k+1)$, at step 528. This can be achieved by subtracting the estimated transmit power $P_j^*(k+1)$ for data user j from the estimated available transmit power $\tilde{P}_{avail}(k+1)$. The user set S is also updated, at step 530, by removing the selected and scheduled data user. The possible data rate $R_i(k+1)$ for each user remaining in the user set S is next updated based on the remaining estimated available transmit power, at step 532.

A determination is then made whether the user set S is empty or the remaining estimated available transmit power $\tilde{P}_{avail}$ is insufficient for any additional data transmission, at step 534. The remaining estimated available transmit power $\tilde{P}_{avail}$ is insufficient if the possible data rate for each of the remaining data users in the user set S is less than the lowest supported data rate $R_{min}$. If the user set is not empty and the remaining estimated available transmit power $\tilde{P}_{avail}$ is sufficient, the process returns to step 522 and the highest priority data user in the user set S is selected for scheduling. Otherwise, the process proceeds to step 542.

At step 542, the scheduled transmit power for each scheduled data user can be determined as follows:

$$P_i(k+1) = \frac{P_i^*(k+1)}{\sum_j P_j^*(k+1)} \cdot \tilde{P}_{avail}(k+1), \qquad \text{Eq (26)}$$

where $\tilde{P}_{avail}(k+1)$ in equation (26) is the estimated available transmit power for the next frame k+1 (and not the remaining estimated available transmit power computed in step 528). Step 542 apportions the estimated available transmit power $\tilde{P}_{avail}(k+1)$ to each scheduled data user to account for quantization of the data rates performed in step 524 (and to also apportion any residual available transmit power not scheduled). The throughput $T_i(k+1)$ of each scheduled data user is then updated, at step 544, to reflect the scheduled data transmission. In an embodiment, the throughput $T_i(k+1)$ can be updated as follows:

$$T_i(k+1) = (1-w_T)T_i(k) + w_T \cdot R_i^*(k+1). \qquad \text{Eq (27)}$$

Equation (27) performs an exponential averaging of the throughput $T_i(k)$ and $w_T$ is the time constant (e.g., in number of frames) for the exponential averaging. Data is then transmitted to each scheduled data user at the quantized data rate $R_i^*(k+1)$ and with the scheduled transmit power $P_i(k+1)$, at step 546.

The scheduling of data transmissions on the forward link is described in further detail in U.S. patent application Ser. No. 09/528,235, filed Mar. 17, 2000 and in Ser. No. 08/798, 951, entitled "METHOD AND APPARATUS FOR FORWARD LINK SCHEDULING," filed Feb. 11, 1997, both assigned to the assignee of the present invention and incorporated herein by reference.

For clarity, various embodiments of the invention have been described for a implementation in the cdma2000 system. However, the invention is also applicable to other CDMA systems that may be designed to conform to one or more other standards and/or designs. For example, the invention can be used for a CDMA system that conforms to the W-CDMA standard.

The scheduling of data transmissions on the forward link is described in further detail in U.S. patent application Ser. No. 09/528,235, filed Mar. 17, 2000 and in Ser. No. 08/798, 951, entitled "METHOD AND APPARATUS FOR FORWARD LINK SCHEDULING," filed Sep. 17, 1999, now U.S. Pat. No. 6,335,922 issued Jan. 1, 2002, both assigned to the assignee of the present invention and incorporated herein by reference.

Figure 6:
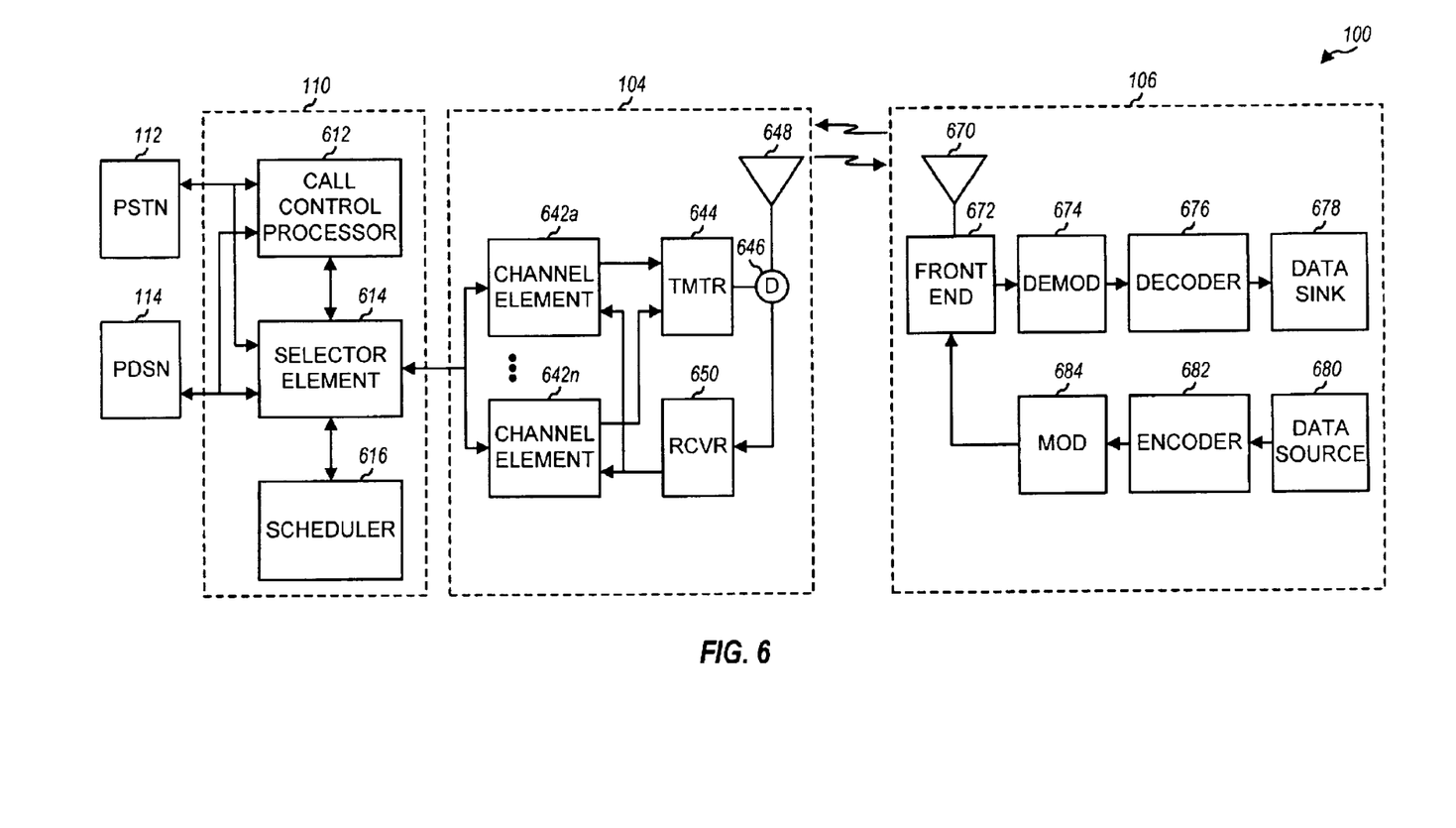
FIG. 6 is a simple block diagram of some of the elements in the communication system shown in FIG. 1.

In the specific design shown in FIG. 6, BSC 110 includes a call control processor 612, a number of selector elements 614 (only one selector element is shown in FIG. 6 for simplicity), and a scheduler 616. Call control processor 612 controls the processing of a call for each remote terminal (e.g., directs the base station to transmit a channel assignment message to the remote terminal on the forward link). One selector element 614 is assigned to control the communication between each remote terminal and one or more base stations. Scheduler 616 couples to all selector elements 614 within BSC 110 and schedules transmissions to data users.

In the design shown in FIG. 6, base station 104 includes a number of channel elements 642a through 642n. One channel element 642 is assigned to process the communication with each remote terminal and couples to the associated selector element 614 also assigned to the remote terminal. Each selector element 614 receives from scheduler 616 the scheduling information for the assigned the remote terminal (e.g., the data rate, transmit power, and transmit time) and forwards the information to the associated channel element 642. Channel element 642 receives, encodes, and modulates data for the assigned remote terminal based on the received scheduling information. The modulated signal is upconverted and conditioned by a transmitter (TMTR) 644, routed through a duplexer 646, and transmitted via an antenna 648 over the forward link.

At the recipient remote terminal 106, the forward link signal is received by an antenna 670 and routed to a front end 672. Front end 672 filters, amplifies, downconverts, and digitizes the received signal. The digitized samples are then demodulated by a demodulator (DEMOD) 674, decoded by a decoder 676, and provided to a data sink 678. The demodulation and decoding are performed in a complementary manner to the modulation and encoding performed at the base station.

Data transmission on the reverse link occurs in a similar manner. Data is provided from a data source 680 within remote terminal 106, encoded by an encoder 682, and modulated by a modulator (MOD) 684 to provide a modulated signal. The modulated signal is then upconverted and conditioned by front end 672 and transmitted via antenna 670.

At base station 104, the reverse link signal is received by antenna 648, routed through duplexer 646, and provided to a receiver (RCVR) 650. Receiver 650 filters, amplifies, downconverts, and digitizes the reverse link signal and provides digitized samples to the channel element 642 assigned to the remote terminal. The assigned channel element 642 demodulates and decodes the samples in a manner complementary to the modulation and encoding performed at the remote terminal. The decoded data may be provided to the selector element 614 assigned to the remote terminal, which may further forward the data to another base station 104, PSTN 112, or PDSN 114. The design, as described above, supports transmission for both data and voice services over the system. Other designs to achieve the above-described functions can be contemplated and are within the scope of the invention.

The processing (e.g., encoding and modulation) for the forward and reverse links are defined by the particular CDMA standard or system being implemented (e.g., IS-95A, W-CDMA, cdma2000, or HDR) and are not described in detail herein.

As noted above, a forward link power control loop can be maintained to adjust the transmit power of the forward link transmission (e.g., based on the quality of the received reverse link signal). The reverse link signal quality can be estimated by receiver 650 in a manner known in the art. The estimated required transmit power $\tilde{P}_i^F(k)$ and data rate $R_i^F(k)$ for a (voice) transmission to each remote terminal and the transmit power for other types of service and transmissions can be provided to scheduler 616. Scheduler 616 can use the received information to estimate the available transmit power $\tilde{P}_{avail}(k+1)$ and to schedule transmissions to data users.

The scheduling process described above can be achieved by various designs. The location of the scheduler is dependent on whether a centralized or distributed scheduling is desired. For example, a scheduler can be located within each base station. This distributed processing allows each base station to perform its own scheduling, which may reduce the processing delay. Conversely, the scheduler can be designed to control transmissions for all base stations in the system (as shown in FIG. 6). This centralized processing may result in a more efficient use of the system resources.

As shown in FIG. 1, the remote terminals are dispersed throughout the system and can be in communication with one or more base stations simultaneously. In a centralized scheduling scheme, the scheduler coordinates transmissions of the scheduled and unscheduled tasks over the entire system such that degradation in the scheduled and unscheduled transmissions is minimized while efficiently utilizing the available system resources. The scheduler is tasked with the function of assigning the data rate to each scheduled user within the system such that a set of goals is optimized. These goals may include (1) improved utilization of the forward link capacity by transmitting as much scheduled and unscheduled tasks as can be supported within system capacity constraints, (2) improved quality in the communication and minimized transmission delay, and (3) fair allocation of the forward link capacity to all scheduled users based on a set of priorities. The goals are optimized by balancing a list of factors. The forward link scheduling is described in further detail in the aforementioned U.S. patent application Ser. No. 09/528,235 and U.S. Pat. No. 6,335,922.

Figure 7:
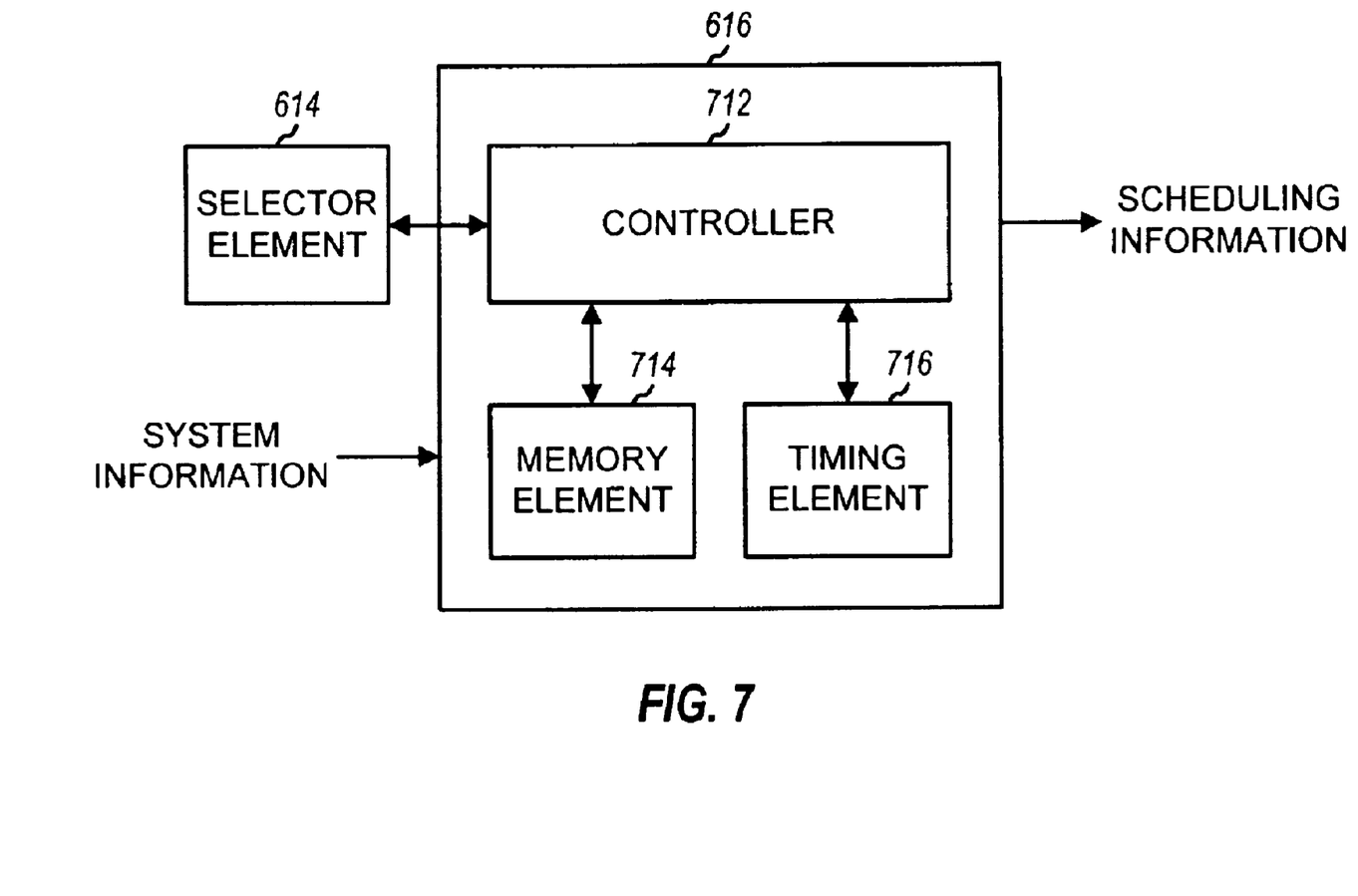
FIG. 7 is a simple block diagram of an embodiment of a scheduler used to schedule data transmissions.

FIG. 7 is a simple block diagram of an embodiment of scheduler 616. In this embodiment, scheduler 616 includes a controller 712 that couples to a memory element 714 and a timing element 716. Controller 712 further couples to selector elements 614 within BSC 110, receives pertinent information from the base stations in the system (e.g., the transmit power and data rate for each remote terminal), receives information regarding the demand and capacity for the forward link, and schedules transmissions to data users. The received information may be stored to memory element 714 and retrieved by controller 712 as needed. Timing element 716 provides controller 712 with the timing signals used to perform the forward link scheduling. The timing signals also allow controller 712 to send the scheduling information (e.g., the scheduled data rates and transmit power) to selector elements 614 at the appropriate time.

The elements of the scheduler (and other elements of the base station and remote terminal) can be implemented in various manners. For example, controller 712 can be implemented with one or more application specific integrated circuits (ASICs), digital signal processors (DSPs), programmable logic devices (PLDs), controllers, micro- controllers, microprocessors, other electronic units designed to perform the functions described herein, or a combination thereof. Memory element 714 can be implemented using RAM, DRAM, Flash RAM, other types of memories, or a combination thereof. Timing element 716 can be implemented with a counter run by a system clock, an on board oscillator locked to an external signal, a storage element for receiving system timing from an external source, or some other design.

Various aspects and embodiments of the invention can be implemented in hardware, software, or a combination thereof. For example, the computations to derive the averaged, predicted, and estimated available transmit power, the first and second margins, the data rates, and other computations described above can be performed by software executed on a processor. The processes described in FIGS. 4 and 5 can also be implemented by a software routine. For a software implementation, the code can be stored in a memory unit (e.g., memory element 714) and executed by a processor (e.g., controller 712).

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a wireless communication system, a method for estimating transmit power available for data transmissions in a future time period, the method comprising:

estimating an amount of variation in the available transmit power over time;

determining a margin to account for the estimated amount of variation in the available transmit power;

predicting transmit power available at a future time instance for data transmissions; and estimating transmit power available for data transmissions for the future time period based on the predicted available transmit power and the margin.

2. The method of claim 1, further comprising:
receiving a set of values indicative of the available transmit power for a prior time period, and
wherein the estimated amount of variation in the available transmit power is based on the received set of values.

3. The method of claim 1, further comprising:
receiving a predicted available transmit power for a prior time instance and an average available transmit power for a prior time period, and
wherein the estimated amount of variation in the available transmit power is based on the received predicted and average available transmit power.

4. The method of claim 3, wherein the received average available transmit power is averaged over a prior transmission interval.

5. The method of claim 3, wherein the estimating the amount of variation includes
determining a difference between the received predicted and average available transmit power, and
determining a first value related to a standard deviation of the difference.

6. The method of claim 5, wherein the determining the first value includes
averaging the difference in accordance with a first weighting scheme,
averaging a square of the difference in accordance with a second weighting scheme to provide a mean square difference, and
computing the first value based on the averaged difference and the mean square difference.

7. The method of claim 6, wherein the averaging the difference and the averaging the square difference are performed over a time window related to a transmission interval.

8. The method of claim 6, wherein the first or second weighting scheme, or both, is an exponential averaging scheme.

9. The method of claim 6, wherein the first or second weighting scheme, or both, is a linear averaging scheme.

10. The method of claim 5, wherein the determining the first value includes
averaging the difference in accordance with a first weighting scheme,
computing a second value based on the difference and the averaged difference, and
averaging the second value in accordance with a second weighting scheme to provide the first value.

11. The method of claim 5, wherein the margin is determined based on the difference and the first value.

12. The method of claim 11, wherein the margin is equal to the difference plus a scaled square root of the first value.

13. The method of claim 1, wherein the margin is determined based on statistics obtained for the available transmit power for a prior time period.

14. The method of claim 1, wherein the estimated available transmit power for the future time period is obtained by subtracting the margin from the predicted available transmit power at the future time instance.

15. The method of claim 1, wherein the predicted available transmit power at the future time instance is a function of the available transmit power at a current time instance or one or more prior time instances, or a combination the current and prior time instances.

16. The method of claim 1, wherein the communication system is operative to support a plurality of types of service, and wherein the estimated available transmit power is used for data service.

17. The method of claim 1, wherein the communication system is a CDMA system.

18. In a wireless communication system, a method for estimating transmit power required for a data transmission over a future time period, the method comprising:
estimating an amount of variation in the required transmit power over time;
determining a margin to account for the estimated amount of variation in the required transmit power; and
estimating transmit power required for the data transmission over the future time period based in part on the margin.

19. The method of claim 18, further comprising:
predicting transmit power required at a future time instance for the data transmission, and
wherein the estimated required transmit power is further based on the predicted required transmit power.

20. The method of claim 18, wherein the estimated required transmit power is further based on an average required transmit power computed for a prior time period.

21. The method of claim 18, further comprising:
estimating a rate of fading for a channel used for the data transmission, and
wherein the estimated required transmit power is further based on the estimated rate of fading.

22. The method of claim 21, wherein the estimated required transmit power is further based on a transmit power predicted to be required at a future time instance for the data transmission, if the estimated rate of fading is less than a particular threshold value.

23. The method of claim 21, wherein the estimated required transmit power is further based on an average required transmit power computed for a prior time period, if the estimated rate of fading is greater than a particular threshold value.

24. The method of claim 18, further comprising:
receiving a predicted required transmit power for a prior time instance and an average required transmit power for a prior time period, and
wherein the estimating the amount of variation includes
determining a difference between the received predicted and average required transmit power, and
determining a value related to a standard deviation of the difference, and
wherein the margin is determined based on the difference and the value related to the standard deviation.

25. In a wireless communication system, a method for estimating transmit power available for data transmissions for a future time period, the method comprising:
receiving a predicted available transmit power for a prior time instance and an average available transmit power for a prior time period;
determining a difference between the received predicted and average available transmit power;
determining a first value related to a standard deviation of the difference;
determining a margin to account for an estimated amount of variation in the available transmit power, wherein the margin is determined based on the difference and the first value;
predicting transmit power available at a future time instance for data transmissions; and estimating transmit power available for data transmissions for the future time period based on the predicted available transmit power at the future time instance and the margin.

26. A method for scheduling data transmissions in a wireless communication system, the method comprising:

estimating an amount of variation in transmit power available for data transmissions;

determining a first margin to account for the estimated amount of variation in the available transmit power;

estimating transmit power available for data transmissions for a future time period based in part on the first margin;

estimating an amount of variation in transmit power required for a particular data transmission;

determining a second margin to account for the estimated amount of variation in the required transmit power; and estimating transmit power available for the particular data transmission based in part on the estimated available transmit power for data transmissions and the second margin.

27. The method of claim 26, wherein the second margin accounts for changes in link conditions associated with the particular data transmission.

28. A method for scheduling data transmissions for a plurality of data users in a wireless communication system, the method comprising:

determining a first margin to account for an estimated amount of variation in transmit power available for data transmissions;

estimating transmit power available for data transmissions for a future time period based in part on the first margin;

determining a possible data rate for each data user based in part on the estimated available transmit power and a second margin determined for the data user;

determining a priority index for each data user; and scheduling data transmissions for the plurality of data users based on the estimated available transmit power and the determined possible data rates and priority indices for the plurality of data users.

29. The method of claim 28, wherein the second margin for each data user accounts for variation in a required transmit power due to changes in link conditions.

30. The method of claim 28, wherein the second margin for each data user is determined based on estimated variation in a required transmit power for the data user.

31. The method of claim 28, wherein the scheduling data transmissions includes selecting a data user having a highest priority index, scheduling a data rate for the selected data user based on the possible data rate determined for the data user;

estimating transmit power required for the scheduled data rate, and updating the estimated available transmit power to reflect the estimated required transmit power for the selected data user.

32. The method of claim 31, wherein the scheduling data transmissions further includes repeating the selecting a data user, scheduling the data rate, estimating required transmit power, and updating the estimated available transmit power until the plurality of data users have been scheduled or the estimated available transmit power is insufficient for additional data transmissions.

33. The method of claim 28, wherein the priority index of each data user is based on the possible data rate and a throughput for the data user.

34. The method of claim 28, wherein the possible data rate for each data user is further based on a power-per-bit estimated to be required for a data transmission to the data user.

35. The method of claim 34, wherein the required power-per-bit for the data transmission to the data user is estimated based on a second transmission to the data user.

36. A scheduler in a wireless communication system, comprising:

a memory unit coupled to the controller and operative to store data used for scheduling data transmission; and a controller coupled to the memory unit and operative to determine a first margin to account for an estimated amount of variation in transmit power available for data transmissions, estimate transmit power available for data transmissions for a future time period based in part on the first margin, determine a possible data rate for each data user based in part on the estimated available transmit power and a second margin determined for the data user, determine a priority index for each data user, and schedule data transmissions for the plurality of data users based on the estimated available transmit power and the determined possible data rates and priority indices for the plurality of data users.

37. An apparatus for estimating transmit power available for data transmissions in a future time period, the apparatus comprising:

means estimating an amount of variation in the available transmit power over time;

means for determining a margin to account for the estimated amount of variation in the available transmit power;

means for predicting transmit power available at a future time instance for data transmissions; and estimating transmit power available for data transmissions for the future time period based on the predicted available transmit power and the margin.

38. An apparatus for estimating transmit power required for a data transmission over a future time period, the apparatus comprising:

means for estimating an amount of variation in the required transmit power over time;

means for determining a margin to account for the estimated amount of variation in the required transmit power; and means for estimating transmit power required for the data transmission over the future time period based in part on the margin.

39. An apparatus for estimating transmit power available for data transmissions for a future time period, the apparatus comprising:

means for receiving a predicted available transmit power for a prior time instance and an average available transmit power for a prior time period;

means for determining a difference between the received predicted and average available transmit power;

means for determining a first value related to a standard deviation of the difference;

means for determining a margin to account for an estimated amount of variation in the available transmit power, wherein the margin is determined based on the difference and the first value;

means for predicting transmit power available at a future time instance for data transmissions; and means for estimating transmit power available for data transmissions for the future time period based on the predicted available transmit power at the future time instance and the margin.

40. An apparatus for scheduling data transmissions in a wireless communication system, the apparatus comprising:

means for estimating an amount of variation in transmit power available for data transmissions;

means for determining a first margin to account for the estimated amount of variation in the available transmit power;

means for estimating transmit power available for data transmissions for a future time period based in part on the first margin;

means for estimating an amount of variation in transmit power required for a particular data transmission;

means for determining a second margin to account for the estimated amount of variation in the required transmit power; and means for estimating transmit power available for the particular data transmission based in part on the estimated available transmit power for data transmissions and the second margin.

41. An apparatus for scheduling data transmissions for a plurality of data users in a wireless communication system, the apparatus comprising:

means for determining a first margin to account for an estimated amount of variation in transmit power available for data transmissions;

means for estimating transmit power available for data transmissions for a future time period based in part on the first margin;

means for determining a possible data rate for each data user based in part on the estimated available transmit power and a second margin determined for the data user;

means for determining a priority index for each data user; and means for scheduling data transmissions for the plurality of data users based on the estimated available transmit power and the determined possible data rates and priority indices for the plurality of data users.

* * * * *